Aug. 3, 1926.
G. E. PURPLE
BELT FASTENING
Filed April 3, 1926
1,594,691
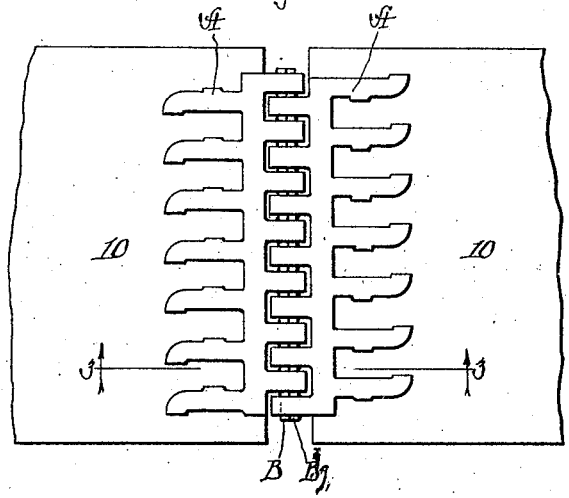
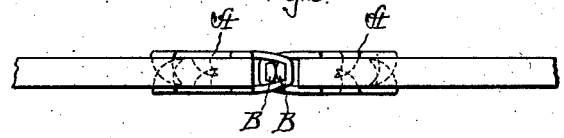
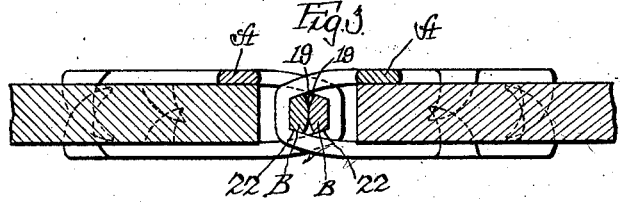
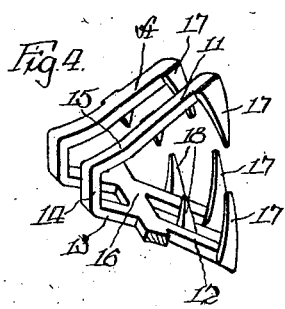
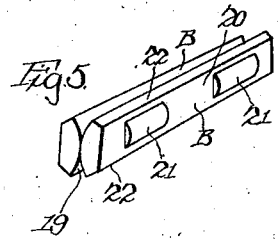
Inventor:
George E. Purple
By George O. Haight
His Atty.

Patented Aug. 3, 1926.

1,594,691

UNITED STATES PATENT OFFICE.

GEORGE E. PURPLE, OF LA GRANGE, ILLINOIS, ASSIGNOR TO FLEXIBLE STEEL LACING COMPANY, OF CHICAGO, ILLINOIS, A CORPORATION OF ILLINOIS.

BELT FASTENING.

Application filed April 3, 1926. Serial No. 99,450.

This invention relates to improvements in belt fastenings.

One object of the invention is to provide a fastening means especially adapted for securing together the ends of machinery belting, comprising separate hinge elements secured to the ends of the belt, and a removable connecting hinge pin means, wherein the hinge pin means is composed of two sections having co-operating bearing faces adapted to take the wear, thereby relieving the hinge pin elements from damage.

Another object of the invention is to provide a belt fastening means of the character indicated, including a hinge element secured to each end of the belt and a sectional hinge pin comprising two members rockable on each other for connecting said elements, wherein cooperating means is provided on the hinge pin sections and the hinge elements to lock each of the members of the hinge pin to one of the hinge elements to compel bodily movement thereof in unison, thereby preventing wear between the hinge pin and the hinge elements.

Other and further objects will more fully and clearly appear from the description and claims hereinafter following.

In the drawing, forming a part of this specification, Figure 1 is a plan view of a portion of a belt showing the adjacent ends thereof, illustrating my improvements in connection therewith. Figure 2 is an edge, elevational view of the structure illustrated in Figure 1. Figure 3 is a longitudinal, sectional view on an enlarged scale, corresponding substantially to the line 3—3 of Figure 1. Figure 4 is a detailed, perspective view of a section partly broken away, of one of the hinge elements of my improved construction. And Figure 5 is a detailed perspective view, partly broken away, of the two part hinge pin employed in connection with my improvements.

In said drawings, 10—10 indicate the adjacent ends of a belt of well-known form connected by my improved means, comprising a pair of hinge elements provided with a two-part hinge pin.

My improved belt fastening, as shown, comprises, broadly, a pair of hinge elements A—A and a two-part sectional hinge pin B—B.

The hinge elements A are of similar design, each being preferably in the form of a folded sheet metal member having a plurality of sets of arms 11 and 12, the arms 11 comprising three sections 13, 14 and 15, the section 14 forming an end member from which the sections 13 and 15 extend angularly, thereby presenting loops or eyes adapted to receive a hinge pin. As most clearly shown in Figures 1 and 4, the arms 11 and 12 of the sets are connected by tongue elements 16, the tongues 16 extending transversely of the hinge element A and forming a connection between the inner ends of the arms 11 and 12. As most clearly shown in Figure 4, the arms 11 are staggered with reference to the arms 12. In other words, the arms 11 are disposed centrally between two adjacent arms 12. The arms 11, including the sections 13, 14 and 15, are spaced apart a distance slightly exceeding the width of these arms so that the corresponding arms of the cooperating hinge section A may be disposed therebetween and have free swinging movement to permit pivotal motion of the hinge sections. At the free ends, each of the arms 11 and 12 are provided with prongs 17 adapted to be forced into the belt when the hinge section is clamped thereon. Each arm 11 and 12 is also provided with a shorter prong 18 spaced inwardly from the prong 17 and serving a similar purpose. As most clearly shown in Figure 4, which illustrates the belt lacing before application to the end of the belt, the arm 12 and the section 15 of the arm 11 of each set diverge outwardly and the section 13 of the arm 11 is disposed in substantial alinement with the corresponding arm 12. The end section 14 of each arm 11 is substantially straight, thereby forming relatively sharp angles with the sections 13 and 15. As most clearly shown in Figures 2 and 3, when the hinge sections A are fixed to the ends of the belt 10, the arms 12 and the sections 15 of the arms 11 are bent toward each other so that they assume an approximately parallel position. When the arms are in this position, it will be evident that the sections 15 of the arms 11 and the sections 13 thereof will also be brought more closely together. When the parts are in this condition, the sections 14, together with the adjacent portions of the sections 13 and 15 of the arms 11, will present angular seats for a purpose hereinafter described. As will be evident, each seat comprises three walls formed by the inner faces of the sections 13, 14 and 15. When the parts are assembled so as to operatively connect the ends of a belt, the loops or eyes of one of the hinge sections A overlap the loops of the other section so as to present openings in alinement adapted to receive the hinge pin.

As most clearly shown in Figures 1, 2, 3 and 5, the hinge pin comprises two like members B, each being preferably in the form of a bar or rod. Each of the sections B is provided on one longitudinal side thereof with a convex rocker bearing surface 19 adapted to co-operate with a similar surface on the other hinge pin member. At the side opposite the surface 19, each member B is provided with a longitudinally extending flat surface or face 20 adapted to co-operate with the inner face of the sections 14 of one of the hinge elements A. At spaced intervals, the surface 20 of each hinge pin member B is provided with laterally outwardly projecting lugs 21—21, these lugs being slightly raised from the surface 20 and being spaced apart a distance slightly greater than the width of the arms 11, so that the lugs will be disposed between adjacent arms 11 when the hinge pin members are assembled with the hinge elements A, thereby preventing endwise movement of the sections B of the hinge pin. The opposite sides of each hinge pin member B are provided with flat, longitudinally extending faces or surfaces 22, the faces 22 being angularly disposed with reference to the faces 20 and diverging slightly outwardly with reference to each other. Each hinge pin member B presents a section defined by the faces 20 and 22 which corresponds to the contour of the seats formed at the eyes of each hinge section. In other words, when the parts are assembled with the two-part key disposed within the eyes of the hinge elements, the angular sections of the hinge pin members B will closely fit the seats of the hinge pin eyes so as to prevent relative movement between each hinge pin member B and the hinge element with the seats of which the member B co-operates.

There is sufficient play or looseness between the parts so that the hinge members B may be inserted within the eyes of the hinge elements A so that the lugs 21 of the hinge pin members will clear the connecting sections 14 of the arms 11. It will be evident that when the belt is in use and under tension, there will be a pull in opposite directions on the hinge sections A, thereby taking up the slack or looseness referred to, and seating the hinge pin sections B within the eyes of the hinge elements A, thus preventing displacement of the hinge pin due to the lugs 21 of the members B being disposed between the arms 11. By providing each of the hinge pin sections with a plurality of lugs 21, the hinge pin members will be retained even if one or both of the same become broken. Due to the hinge pin members B being seated in the eyes of the hinge pin sections and due to the angular contour of the seats and co-operating surfaces of the hinge pin members B, the latter will be compelled to rock with the respective hinge elements as the belt travels in a curved path, thereby compelling the hinge pin members B to rock on the co-operating convex rocker surfaces 19. It will be evident that there be no rocking or other movement between the hinge pin members B and the hinge elements A and wear between these parts will be entirely prevented.

Although I have herein illustrated my improvements as applied to belt fasteners comprising two hinge sections, composed of sheet metal, it will be evident that my invention may be applied equally well in connection with other forms of hinge members. For example, hinge members each comprising a plurality of separate and distinct loop members of wire or other material instead of connected loop members.

It will be further evident that my invention is not limited to the angular design of hinge pin seat and co-operating hinge pin member of angular section, but that seats and hinge pin members of any contour, shape or design, may be employed so long as the parts so inter-fit as to prevent relative movement between the hinge elements and the co-operating hinge pin members, thereby compelling the hinge pin members to rock on each other.

While I have herein shown and described what I now consider the preferred manner of carrying out my invention, the same is merely illustrative, and I contemplate all changes and modifications that come within the scope of the claims appended hereto.

I claim:

1. In a fastening for flexible driving elements, the combination with a pair of hinge elements attachable to the opposite ends of the driving element, said hinge elements having aligned hinge pin receiving openings; of a removable sectional pin disposed within said openings for hingedly connecting said hinge elements, said hinge pin sections having co-operating rocker bearing surfaces, each section of said pin having means thereon engageable with one of said hinge elements to effect bodily movement of said section and element in unison, said means including inter-fitting irregular surfaces on said pin section and hinge element.

2. In a belt fastening, the combination with a pair of hinge elements attachable to the opposite ends of a belt, said elements having hinge pin receiving openings, the opening of each element having walls providing a seat presenting a plurality of separate abutment surfaces; of a two-part hinge pin disposed within said openings for connecting said hinge elements, each part of said pin being provided with a section presenting a plurality of abutment surfaces accommodated in the seat of one of said elements, and having the abutment surfaces thereof bearing on the walls of said seat, said section corresponding in contour to the seat.

3. In a belt fastening, the combination with a pair of hinge elements attachable to the opposite ends of a belt, each of said sections including a loop member providing a hinge pin receiving opening, said loop having an angular seat; of a detachable hinge pin for pivotally connecting the loops of said hinge elements, said pin including two separable members having co-operating rocker bearing surfaces, said members having angular sections, the angular section of one of said members fitting the seat of one of said hinge elements and the angular section of the other member fitting the seat of the other hinge element, whereby said hinge pin sections are compelled to move in unison with the respective hinge sections and rock on each other.

4. In a belt fastening, the combination with a pair of hinge elements attachable to the opposite ends of a belt, each of said hinge sections having a hinge pin receiving opening therein; of a sectional hinge pin comprising two members having co-operating rocker bearing surfaces, each member having a section presenting opposed abutment faces, and each hinge element having opposed abutment faces co-operating with the opposed faces of one of said first named members to prevent relative movement of said singe section and member.

5. In a belt fastening, the combination with a pair of hinge elements secured respectively to the opposite ends of a belt; of a sectional hinge pin comprising two members having co-operating rocker bearing surfaces, said members having sections provided with co-operating means thereon operative when the belt is under tension for maintaining one of said members in a predetermined fixed position with reference to one of said hinge elements and the other member in predetermined relative fixed position with reference to the other hinge elements.

6. In a belt fastening comprising a pair of sheet metal hinge elements, each element including a plurality of hinge pin receiving loops and means for permanently securing the same to the belt; of a sectional hinge pin extending through the loops of the said elements, said hinge pin comprising two members having co-operating rocker bearings, each loop of said elements having angularly disposed abutment surfaces presenting a seat, and one of said hinge pin members having a section inter-fitting with the seats of the loops of one of said hinge elements, and the other of said hinge pin members having a section interfitting with the seats of the loops of the other hinge element.

7. In a belt fastening, the combination with a pair of hinge members fixed respectively to the opposite ends of a belt; of a sectional hinge pin comprising two members having co-operating rocker bearing surfaces, said members having means thereon operative when the bracket is under tension for maintaining one of said members in a predetermined fixed position with reference to one of said hinge elements and the other member in predetermined relative fixed position with reference to the other hinge element, each of said members having means thereon co-operating with the hinge elements to prevent endwise displacement of said members.

In witness that I claim the foregoing I have hereunto subscribed my name this 23rd day of March 1926.

GEORGE E. PURPLE.